(12) United States Patent
Hirasawa et al.

(10) Patent No.: US 11,758,290 B2
(45) Date of Patent: Sep. 12, 2023

(54) IMAGE PROCESSING DEVICE, IMAGE PROCESSING METHOD, AND IMAGE PICKUP DEVICE

(71) Applicant: SONY GROUP CORPORATION, Tokyo (JP)

(72) Inventors: Yasutaka Hirasawa, Tokyo (JP); Yuhi Kondo, Tokyo (JP); Legong Sun, Tokyo (JP); Taishi Ono, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/789,406

(22) PCT Filed: Dec. 18, 2020

(86) PCT No.: PCT/JP2020/047434
§ 371 (c)(1),
(2) Date: Jun. 27, 2022

(87) PCT Pub. No.: WO2021/140873
PCT Pub. Date: Jul. 15, 2021

(65) Prior Publication Data
US 2023/0053038 A1    Feb. 16, 2023

(30) Foreign Application Priority Data
Jan. 9, 2020   (JP) .................................. 2020-002033

(51) Int. Cl.
*H04N 25/633*   (2023.01)
*H04N 25/77*    (2023.01)
*H04N 23/84*    (2023.01)

(52) U.S. Cl.
CPC ......... *H04N 23/843* (2023.01); *H04N 25/633* (2023.01); *H04N 25/77* (2023.01)

(58) Field of Classification Search
CPC .... H04N 23/683; H04N 25/633; H04N 25/77; H04N 25/13; H04N 25/683; H04N 25/11; H04N 25/133
See application file for complete search history.

(56) References Cited

U.S. PATENT DOCUMENTS 10,460,422 B2 * 10/2019 Kurita ..................... H04N 15/13
10,704,957 B2 *  7/2020 Mitani ....................... G01J 4/04
(Continued)

FOREIGN PATENT DOCUMENTS

EP         3509294 A1      7/2019
JP      2009-290895 A     12/2009
(Continued)

*Primary Examiner* — Marly S Camargo
(74) *Attorney, Agent, or Firm* — Paratus Law Group, PLLC

(57) ABSTRACT

The invalid pixel detection unit 32 detects an invalid pixel from a non-polarized image and a plurality of polarized images for different polarization directions obtained by performing image pickup using the polarization image pickup unit 20. For example, the invalid pixel detection unit 32 detects a saturated pixel having a pixel value larger than a preset saturation detection threshold and a black-crushed pixel having a pixel value smaller than a preset black crushing detection threshold as invalid pixels from a non-polarized image. The polarization information generation unit 33 performs processing of generating polarization information on the basis of the non-polarized image and polarized images and switches the processing of generating the polarization information depending on the detection result of the invalid pixels in the invalid pixel detection unit 32, so as to generate the polarization information without using the invalid pixels. Correct polarization information can be acquired.

12 Claims, 12 Drawing Sheets

(56) References Cited

U.S. PATENT DOCUMENTS

| | | | |
|---|---|---|---|
| 10,750,136 B2 * | 8/2020 | Kaizu | .................... H04N 23/72 |
| 10,848,727 B2 * | 11/2020 | Kondo | .................... H04N 23/56 |
| 2019/0166342 A1 * | 5/2019 | Kondo | .................... H04N 9/64 |
| 2019/0260974 A1 | 8/2019 | Shun | |
| 2023/0129785 A1 * | 4/2023 | Kouta | .................... G01B 5/008 |

FOREIGN PATENT DOCUMENTS

| | | |
|---|---|---|
| JP | 2017-228983 A | 12/2017 |
| JP | 2018-029280 A | 2/2018 |
| WO | WO 2017/085993 A1 | 5/2017 |
| WO | WO-2018034211 A1 | 2/2018 |
| WO | WO 2018/074064 A1 | 4/2018 |

* cited by examiner

IMAGE PROCESSING DEVICE, IMAGE PROCESSING METHOD, AND IMAGE PICKUP DEVICE

CROSS REFERENCE TO PRIOR APPLICATION

This application is a National Stage Patent Application of PCT International Patent Application No. PCT/JP2020/047434 (filed on Dec. 18, 2020) under 35 U.S.C. § 371, which claims priority to Japanese Patent Application No. 2020-002033 (filed on Jan. 9, 2020), which are all hereby incorporated by reference in their entirety.

TECHNICAL FIELD

This technology relates to an image processing device, an image processing method, and an image pickup device, and enables acquisition of highly accurate polarization information.

BACKGROUND ART

Conventionally, a method of acquiring a polarized image by using a polarization image pickup unit and a polarizing filter has been disclosed. For example, Patent Document 1 discloses a method of disposing a patterned polarizer and a color mosaic filter in front of an image pickup element to perform image pickup of an object, and acquiring color information and polarization information on the basis of an obtained polarized image. Furthermore, Patent Document 2 discloses acquiring highly accurate polarization information as compared with a case where polarization information is generated on the basis of a polarized image, by using not only a polarized image indicating a polarization component but also a non-polarized image in which the amount of light is not decreased.

CITATION LIST

Patent Document

Patent Document 1: Japanese Patent Application. Laid-Open No. 2009-29089
Patent Document 2: International Publication WO 2018/074064

SUMMARY OF THE INVENTION

Problems to be Solved by the Invention

Meanwhile, it is necessary for both of two non-polarization pixels and two polarization pixels to hold effective pixel values in order to acquire highly accurate polarization information by using non-polarization pixels, and there is a possibility that an error is included in the acquired polarization information if saturation of a non-polarization pixel or black crushing of a polarization pixel occurs.

Thus, the present technology provides an image processing device, an image processing method, and an image pickup device capable of acquiring correct polarization information.

Solutions to Problems

A first aspect of the present technology is an image processing device including:

an invalid pixel detection unit that detects a saturated pixel and a black-crushed pixel as invalid pixels from a non-polarized image and a plurality of polarized images for different polarization directions obtained by performing image pickup using a polarization image pickup unit; and a polarization information generation unit that performs processing of Generating polarization information on the basis of the non-polarized image and the polarized images, and switches processing of generating the polarization information depending on a detection result of the invalid pixels in the invalid pixel detection unit.

In the present technology, the invalid pixel detection unit detects an invalid pixel from a non-polarized image and a plurality of polarized images for different polarization directions obtained by performing image pickup using the polarization image pickup unit. For example, the invalid pixel detection unit detects a saturated pixel having a pixel value larger than a preset saturation detection threshold, and a black-crushed pixel having a pixel value smaller than a preset black crushing detection threshold as invalid pixels from a non-polarized image. The saturation detection threshold and the black crushing detection threshold may be set depending on the characteristic of an image acquired by image pickup by the polarization image pickup unit. For example, the black crushing detection threshold is set to be larger than the output minimum value of the polarization image pickup unit by a first level, and the saturation detection threshold is set to be smaller than the output maximum value of the polarization image pickup unit by a second level smaller than the first level.

The polarization information generation unit performs processing of generating polarization information on the basis of a non-polarized image and polarized images, and switches processing of generating polarization information depending on the detection result of the invalid pixel in the invalid pixel detection unit. For example, in a case where a pixel of a non-polarized image is detected as an invalid pixel, the polarization information generation unit generates polarization information by using a pixel of the non-polarized image and pixels of two or more polarized images for at least polarization directions that are not orthogonal to each other, the pixels being not detected as invalid pixels. The plurality of polarized images is three or more polarized images for different polarization directions, and the polarization information generation unit generates polarization information by using a pixel of the non-polar zed image and pixels of at least two polarized images, the pixels being not detected as invalid pixels. Furthermore, in a case where no invalid pixel is detected, the polarization information generation unit generates polarization information by using a pixel of a non-polarized image and a pixel of a polarized image.

A second aspect of the present technology is an image processing method including the steps of:

detecting, by an invalid pixel detection unit, a saturated pixel and a black-crushed pixel as invalid pixels from a non-polarized image and a plurality of polarized images for different polarization directions obtained by performing image pickup using a polarization image pickup unit; and performing, by a polarization information generation unit, processing of generating polarization information on the basis of the non-polarized image and the polarized images, and switching processing of generating the polarization information depending on a detection result of the invalid pixels is in the invalid pixel detection unit.

A third aspect of the present technology is a program causing a computer to execute generation of polarization information, the program causing the computer to execute:

a procedure of detecting a saturated pixel and a black-crushed pixel as invalid pixels from a non-polarized image and a plurality of polarized images for different polarization directions obtained by performing image pickup using a polarization image pickup unit;

a procedure of performing processing of generating polarization information on the basis of the non-polarized image and the polarized images; and a procedure of switching processing of generating the polarization information depending on a detection result of the invalid pixels.

MODE FOR CARRYING OUT THE INVENTION

The following description will explain modes for carrying out the present technology. Note that description will be given in the following order.

Figure 1:
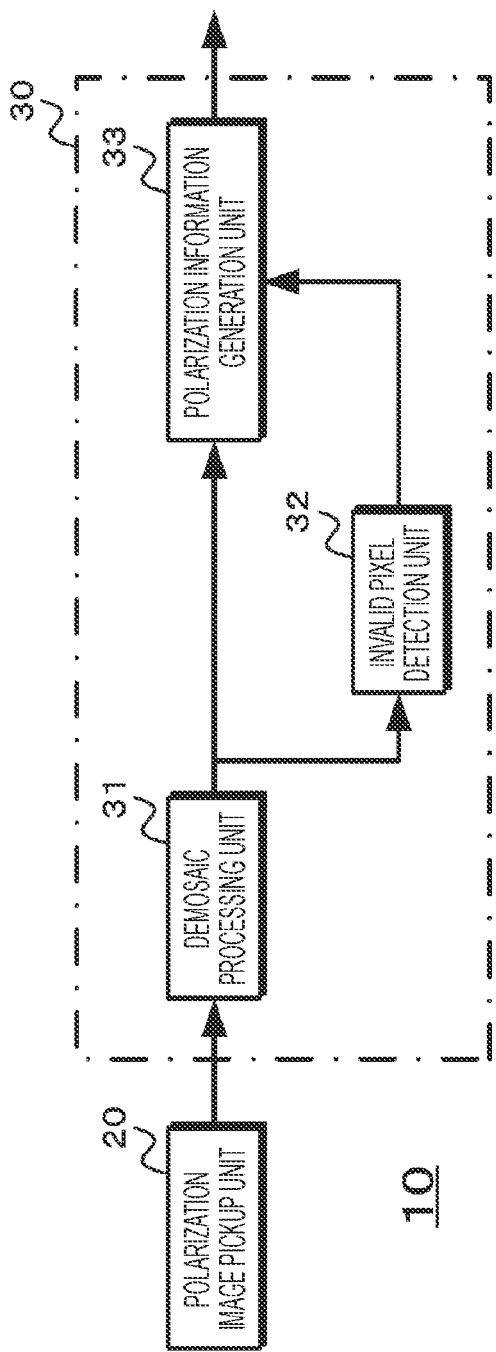
FIG. 1 is a diagram illustrating a configuration of a system that uses an image processing device.

1. Configuration and operation of embodiment
2. Another embodiment.
3. Application Example 1. Configuration and Operation of Embodiment FIG. 1 illustrates a configuration of a system that uses an image processing device. A system. 10 includes a polarization image pickup unit 20 and an image processing unit 30.

In the polarization image pickup unit 20, non-polarization pixels and polarization pixels provided for each of at least two polarization directions are disposed, and an image signal of a captured image is generated and outputted to the image processing unit 30.

Figure 2:
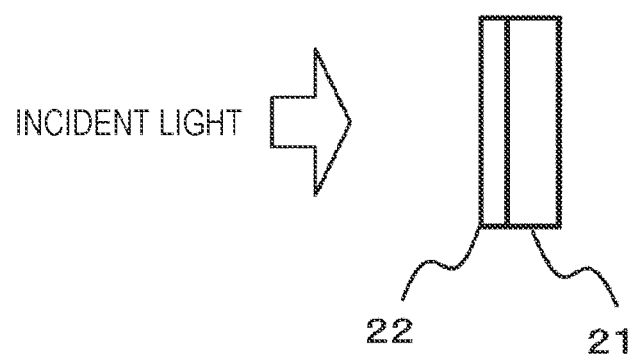
FIG. 2 is a diagram illustrating a configuration of a polarization image pickup unit.

FIG. 2 illustrates a configuration of the polarization image pickup unit. The polarization image pickup unit 20 has a configuration in which a polarizing filter 22 is disposed on an incident surface of an image pickup element 21 such as a complementary metal oxide semiconductor (CMOS) or a charge coupled device (CCD).

Figure 3:
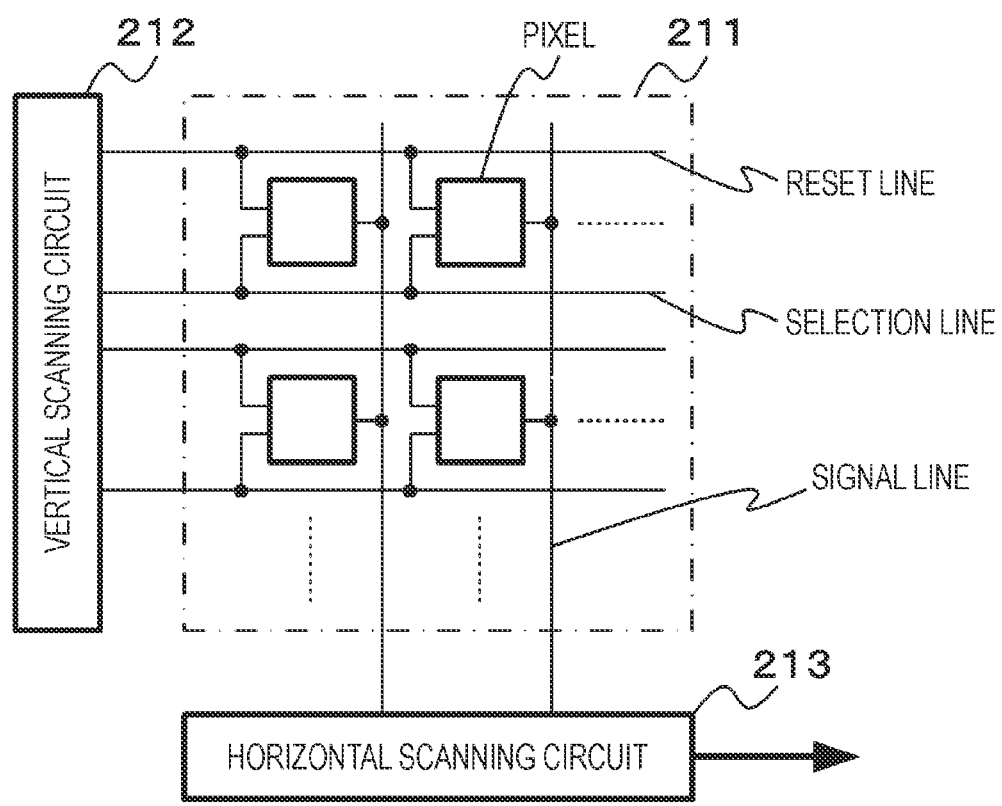
FIG. 3 is a diagram illustrating a configuration of an image pickup element.

FIG. 3 illustrates a configuration of the image pickup element. The image pickup element 21 has a pixel array unit 211 in which a plurality of pixels is arranged in an array, for example, a two-dimensional matrix, and a vertical scanning circuit 212 and a horizontal scanning circuit 213 that perform drive control and the like of the pixel array unit 211. Note that only some pixels in the row direction and the column direction are shown in the pixel array unit 211 in order to simplify the description.

Although not illustrated, each pixel of the pixel array unit 211 has a photodiode and a transistor for charge transfer or reset. Each pixel is connected with the vertical scanning circuit 212 via a reset line and a selection line, and is connected with the horizontal scanning circuit 213 via a signal line.

The vertical scanning circuit 212 outputs a reset signal to a pixel resetting transistor via a reset line to discharge the accumulated charge. Thereafter, the vertical scanning circuit 212 outputs a read signal to a charge transfer transistor of a polarization pixel and a non-polarization pixel via a selection line, and outputs the charge accumulated during the exposure period from the output of the reset signal to the output of the read signal to the signal line as a signal current. The horizontal scanning circuit 213 performs processing of converting a signal current read from each pixel into a digital pixel signal, gain adjustment processing of the pixel signal, and the like, and outputs the processed pixel signal to the image processing unit 30 in the order of pixels in the horizontal direction. Furthermore, the vertical scanning circuit 212 and the horizontal scanning circuit 213 perform the above-described processing for each line.

Figure 4:
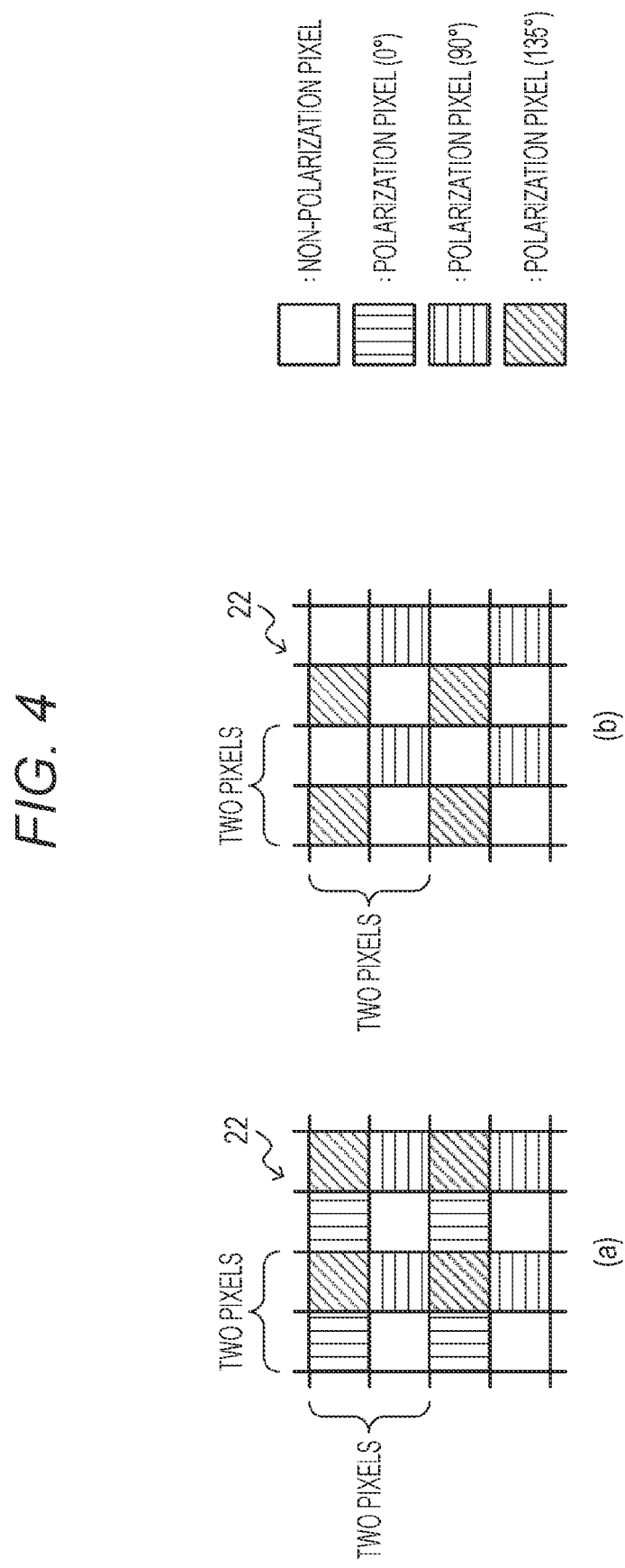
FIG. 4 is a diagram illustrating a pixel configuration of a polarizing filter.

FIG. 4 illustrates a pixel configuration of the polarizing filter. The polarizing filter 22 includes non-polarization pixels and polarization pixels for at least two polarization directions, and a photonic liquid crystal, a wire grid, or the like is used in the polarization pixels.

(a) of FIG. 4 illustrates a case where the polarizing filter 22 includes non-polarization pixels and three types of polarization pixels for different polarization directions. The polarizing filter 22 includes, for example, a 2×2 pixel region as a polarization pixel block, the polarization pixel block includes one non-polarization pixel and three polarization pixels for polarization directions that are "0°, 90°, and 135°", and such a polarization pixel block is repeatedly provided in the horizontal direction and the vertical direction.

(b) of FIG. 4 illustrates a case where the polarizing filter 22 includes non-polarization pixels and two types of polarization pixels for different polarization directions. The polarizing filter 22 includes, for example, a 2×2 pixel region as a polarization pixel block, the polarization pixel block includes two non-polarization pixels and two polarization pixels for polarization directions that are "90° and 135°", and such a polarization pixel block is repeatedly provided in the horizontal direction and the vertical direction.

The polarization image pickup unit. 20 configured as described above sequentially reads pixel signals to generate an image signal of the captured image including the polarization pixels and the non-polarization pixels, and outputs the image signal to the image processing unit 30. Furthermore, the polarization image pickup unit 20 may control the reset timing of the non-polarization pixels to set the exposure period of the non-polarization pixels such that the non-polarization pixels have the same sensitivity as that of the polarization pixels.

The image processing unit 30 includes a demosaic processing unit 31, an invalid pixel detection unit 32, and a polarization information generation unit 33. Note that the demosaic processing unit 31 may be provided in the polarization image pickup unit 20.

The demosaic processing unit 31 generates a non-polarized image and a polarized image for each polarization direction from a captured image acquired by the polarization image pickup unit 20.

The demosaic processing unit 31 calculates the pixel value of a polarization pixel at the pixel position of a target pixel for each polarization direction by using polarization pixels at pixel positions for the same polarization direction in the target pixel and peripheral pixels of the target pixel in the captured image acquired by the polarization image pickup unit 20, and non-polarization pixels at a pixel position equal to that of the polarization pixel and the pixel position of the target pixel.

Furthermore, in a case where the pixel interval of non-polarization pixels having higher sensitivity than that of the polarization pixel is equal to or smaller than the pixel interval in the same polarization direction, the non-polarized image generated from non-polarization pixels has a resolution equal to or higher than that of the polarized image generated from pixels in the same polarization direction. Therefore, on the assumption that there is a positive correlation between a non-polarization pixel and a polarization pixel, the demosaic processing unit 31 generates a high-resolution polarized image by compensating the high-frequency component lost in the polarized image from the non-polarized image. For example, the demosaic processing unit calculates the pixel value of the polarization pixel at a pixel position of the target pixel with respect to the pixel average value of polarization pixels at a pixel position for the same polarization direction by using the relationship between the pixel average value of non-polarization pixels at a pixel position for the same polarization direction and the pixel value of non-polarization pixels at a pixel position of the target pixel.

Figure 5:
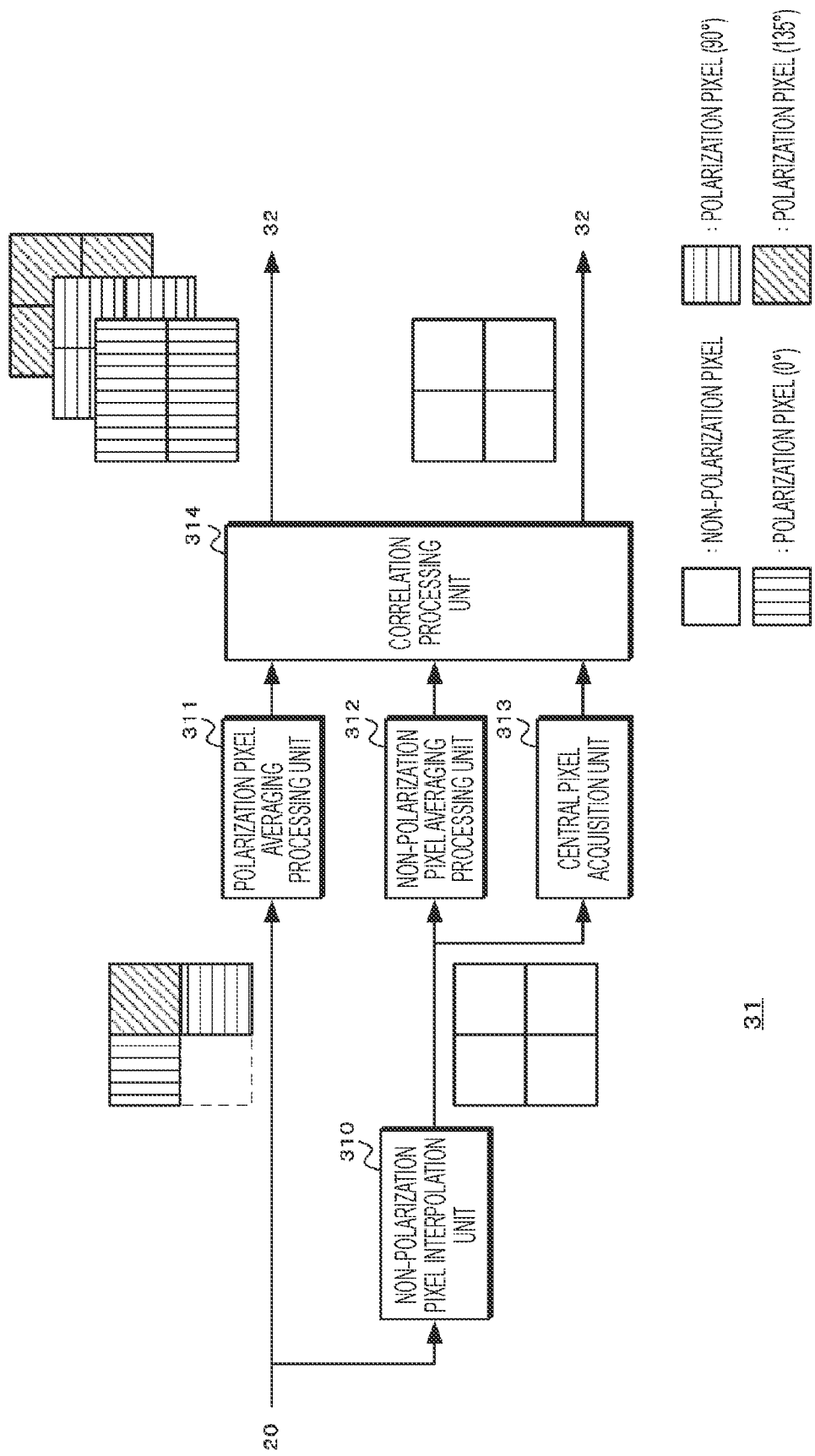
FIG. 5 is a diagram illustrating a configuration of a demosaic processing unit.

FIG. 5 illustrates a configuration of the demosaic processing unit. The demosaic processing unit 31 includes a non-polarization pixel interpolation unit 310 for generating a non-polarized image, a polarization pixel averaging processing unit 311 for generating a high-resolution polarized image by using a non-polarized image, a non-polarization pixel averaging processing unit 312, a central pixel acquisition unit 313, and a correlation processing unit 314.

The non-polarization pixel interpolation unit 310 calculates the pixel value at a pixel position where the pixel value of a non-polarization pixel is not obtained in the captured image acquired by the polarization image pickup unit 20 by interpolation processing or the like using the pixel values of peripheral non-polarization pixels so as to generate a non-polarized image. The non-polarization pixel interpolation unit 310 outputs the generated non-polarized image to the non-polarization pixel averaging processing unit 312 and the central pixel acquisition unit 313.

The polarization pixel averaging processing unit. 311 calculates a pixel average value for the target pixel for each polarization direction by using the target pixel and peripheral pixels located around the target pixel, and outputs the pixel average value to the correlation processing unit 314.

The non-polarization pixel averaging processing unit 312 calculates a pixel average value from pixels at pixel positions equal to those of a case of calculating the pixel average value for each polarization direction by the polarization pixel averaging processing unit 311, by using the target pixel and peripheral pixels located around the target pixel, and outputs the pixel average value to the correlation processing unit 314.

The central pixel acquisition unit 313 extracts the pixel value of the target pixel from the non-polarized image and outputs the pixel value to the correlation processing unit 314.

The correlation processing unit 314 calculates the pixel value of the target pixel for each polarization direction from the pixel average value for each polarization direction calculated by the polarization pixel averaging processing unit 311, the pixel average value calculated by the non-polarization pixel averaging processing unit 312 according to the pixel average value for each polarization direction, and the pixel value of the target pixel extracted by the central pixel acquisition unit 313.

Figure 6:
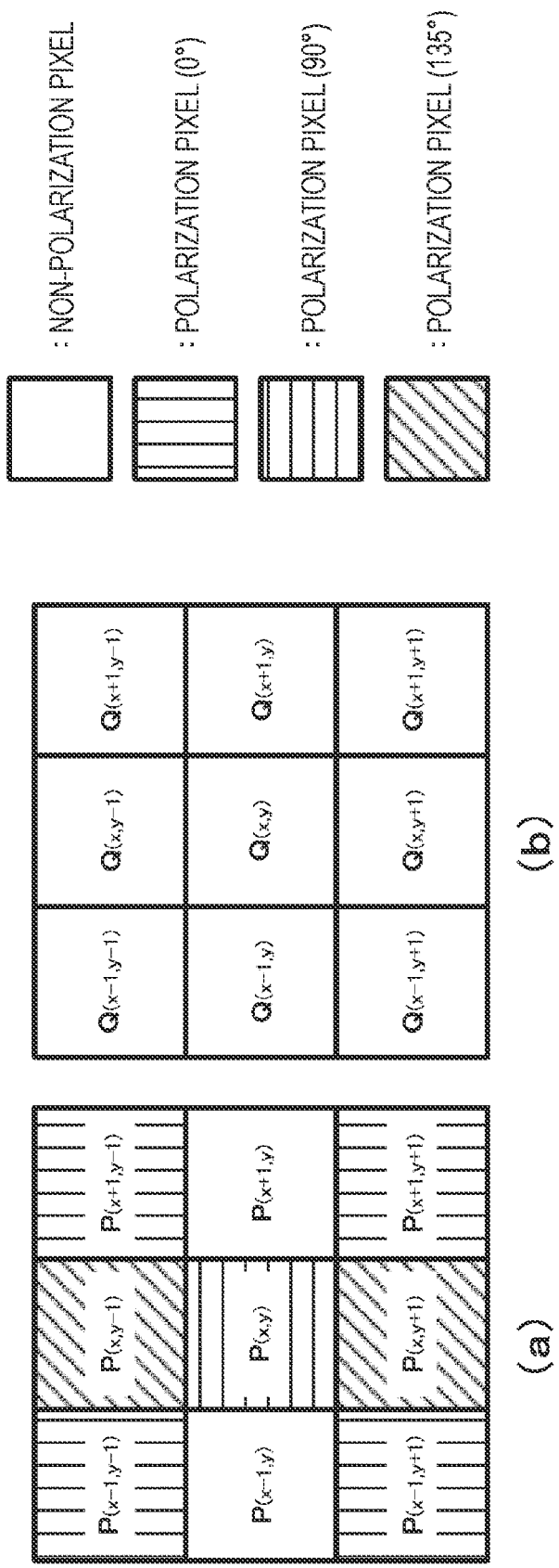
FIG. 6 is a diagram for explaining demosaic processing of a polarization pixel.

The demosaic processing of a polarization pixel will be described with reference to FIG. 6. (a) of FIG. 6 shows a polarized image, and (b) of FIG. 6 shows a non-polarized image. The polarization pixel averaging processing unit 311 calculates the pixel average value for each polarization direction by using pixels at the target pixel position "x, y" and the peripheral pixel positions "x−1, y−1", "x, y−1", "x+1, y−1", "x−1, y", "x+1, y", "x−1, y+1", "x, y+1", and "x+1, y+1" in the polarized image. Here, the pixel value at the target pixel position in the polarized image is expressed as "P (x, y)", and the pixel values at the peripheral pixel positions are expressed as "P(x−1, y−1)", "P(x, y−1)", "P(x+1, y−1)", "P(x−1, y)", "P (x+1, y)", "P (x−1, y+1)", "P(x, y+1)", and "P(x+1, y+1)". Furthermore, the pixel value at the target pixel position in the non-polarized image is expressed as "Q(x, y)", and the pixel values at the peripheral pixel positions are expressed as "Q(x−1, y−1)", "Q(x, y−)", "Q(x+1, y−1)", "Q(x−1, y)", "Q(x+1, y)", "Q(x−1, y+1)", "Q(x, y+1)", and "Q(x+1, y+1)".

The polarization pixel averaging processing unit 311 calculates a pixel average value mP0(x, y) for a polarization direction of "α0=90°" at the target pixel position "x, y" on the basis of Expression (1), for example. Similarly, the polarization pixel averaging processing unit 311 calculates a pixel average value mP1(x, y) for a polarization direction of "α1=0°" at the target pixel position "x, y" on the basis of Expression (2). Furthermore, the polarization pixel averaging processing unit 311 calculates a pixel average value mP2(x, y) for a polarization direction of "α2=135°" at the target pixel position "x, y" on the basis of Expression (3).

$$mP0(x,y)=P(x,y) \qquad (1)$$

$$mP1(x,y)=(P(x-1,y-1)+P(x+1,y-1)+P(x-1,y+1)+P(x+1,y+1))/4 \qquad (2)$$

$$mP2(x,y)=(P(x,y-1)+P(x,y+1))/2 \qquad (3)$$

The non polarization pixel averaging processing unit 312 calculates the pixel average value from the pixel values at the pixel positions equal to those of the case of calculating the pixel average value for each polarization direction, by using the target pixel and peripheral pixels of the target pixel in the non-polarized image. For example, the non-polarization pixel averaging processing unit 312 calculates a pixel average value mQ0(x, y) with respect to the pixel average value for the polarization direction of "α0=0" on the basis of Expression (4) at the target pixel position "x, y". Similarly, the non-polarization pixel averaging processing unit 312 calculates a pixel average value mQ1(x, y) with respect to the pixel average value for the polarization direction of "α1=0°" on the basis of Expression (5). Furthermore, the non-polarization pixel averaging processing unit 312 calculates a pixel average value mQ2(x, y) with respect to the pixel average value for the polarization direction of "α2=135°" on the basis of Expression (6).

$$mQ0(x,y)=Q(x,y) \quad (4)$$

$$mQ1(x,y)=(Q(x-1,y-1)+Q(x+1,y-1)+Q(x-1,y+1)+Q(x+1,y+1))/4 \quad (5)$$

$$mQ2(x,y)=(Q(x,y-1)+Q(x,y+1))/2 \quad (6)$$

On the assumption that there is a positive correlation between a polarization pixel and a non-polarization pixel, the correlation processing unit. 314 calculates the pixel value for each polarization direction at the target pixel position from the pixel average value calculated from the polarized image, the pixel average value calculated from the non-polarized image, and the pixel value of the target pixel in the non-polarized image.

For example, the correlation processing unit 314 calculates a pixel value P0(x, y) of the polarization pixel for the polarization direction of "α0=90°" at the target pixel position "x, y" on the basis of Expression (7). Similarly, the correlation processing unit 314 calculates a pixel value P1(x, y) of the polarization pixel for the polarization direction of "α1=0°" at the target pixel position "x, y" on the basis of. Expression (8). Furthermore, the correlation processing unit 314 calculates a pixel value P2(x, y) of the polarization pixel for the polarization direction of "α2=135=135°" at the target pixel position "x, y" on the basis of Expression (9). Note that the correlation processing unit 314 outputs a pixel value Q(x, y) as the pixel value of the target pixel of the non-polarized image.

$$P0(x,y)mP0(x,y)\cdot Q(x,y)/mQ0(x,y) \quad (7)$$

$$P1(x,y)=mP1(x,y)\cdot Q(x,y)/mQ1(x,y) \quad (8)$$

$$P2(x,y)=mP2(x,y)\cdot Q(x,y)/mQ2(x,y) \quad (9)$$

The demosaic processing unit. 31 generates a polarized image for each polarization direction by performing the above-described processing with each pixel of the polarized image as a target pixel. Furthermore, since the demosaic processing unit 31 normalizes the signal component of the non-polarization pixel with the pixel average value and superimposes the normalized signal component on the polarization pixel, it is possible to improve a problem such as folding caused by the frequency limit of the polarization pixel, for example, and it is possible to generate a polarized image having a resolution equivalent to that of the non-polarized image for each polarization direction Note that, in a case where the pixel array corresponds to the Bayer array, a non-polarized image and a polarized image for each polarization direction may be generated by performing processing similar to the processing disclosed in the literature "B. Gunturk, J. Glotzbach, Y. Altunbasak, R. schafer, and R. Mersereau, "Demosaicing: Color filter array interpolation,".". in IEEE Signal Processing Magazine, vol. 22, no. 1, January 2005.", for example. Furthermore, the demosaic processing unit 31 only needs to be able to generate a non-polarized image and a polarized image for each polarization direction, and the demosaic processing is not limited to the above-described method.

The invalid pixel detection unit 32 detects an invalid pixel by comparing a preset threshold with the pixel values of the non-polarization pixel and the polarization pixel. As the threshold, a saturation detection threshold Tha for detecting a saturated pixel and a black crushing detection threshold Thb for detecting a black-crushed pixel are set. The invalid pixel detection unit 32 compares the pixel value of each pixel with the saturation detection threshold. Tha, and determines a pixel having a pixel value larger than the saturation detection threshold Tha as an invalid pixel. Furthermore, the invalid pixel detection unit 32 compares the pixel value of each pixel with the black crushing detection threshold Thb, and determines a pixel having a pixel value smaller than the black crushing detection threshold Thb as an invalid pixel. Furthermore, the non-polarization pixel has a larger amount of incident light (higher sensitivity) than the polarization pixel because a polarizing filter is not provided, and the polarization pixel has a smaller amount of incident light (lower sensitivity than the polarization pixel because the amount of light is reduced by the polarizing filter. Therefore, an invalid pixel may be detected by comparing the pixel value of the non-polarized image with the saturation detection threshold Tha, and an invalid pixel may be detected by comparing the pixel value of the polarized image with the black crushing detection threshold Thb.

For the saturation detection threshold Tha and the black crushing detection threshold Thb, a level difference between a prescribed level and a threshold, for example, a level difference between the maximum output level of the polarization image pickup unit 20 and the saturation detection threshold Thb, and a level difference between the minimum output level of the polarization image pickup unit 20 and the black crushing detection threshold Thb may be set equal, or the thresholds may be set individually depending on the characteristic of the polarization image pickup unit 20. For example, it is known that shot noise depending on the signal charge amount occurs in the image pickup element. 21 and the shot noise is proportional to the square root of the signal charge amount. Therefore, the black crushing detection threshold. Thb is set to be larger than the output minimum value of the polarization image pickup unit 20 by the first level, and the saturation detection threshold Tha is set to be smaller than the output maximum value of the polarization image pickup unit 20 by the second level smaller than the first level. By setting the saturation detection threshold Tha and the black crushing detection threshold Thb in this manner, it is possible to prevent the influence of noise at the time of detection of an invalid pixel in which black crushing has occurred from becoming larger than that at the time of detection of an invalid pixel in which saturation has occurred. Furthermore, the saturation detection threshold. Tha and the black crushing detection threshold Thb may be set depending on the optical characteristic of the polarizing filter 22. For example, when the transmittance of the polarizing filter 22 is low, the amount of light incident on the image pickup element 21 is small, and thus the signal level of the pixel signal is low. Furthermore, in a case where the level of the pixel signal is adjusted, the gain becomes high, and there is a possibility that the influence of noise becomes large as compared with a case where the transmittance is high. Therefore, the level difference between the prescribed level and the Threshold may be larger in a case where the transmittance of the polarizing filter 22 is low than a case where the transmittance is high.

The invalid pixel detection unit 32 compares the saturation detection threshold Tha and the black crushing detection threshold Thb (<Tha) with a pixel value I(x, θ) of the pixel x, and sets the pixel x as an invalid pixel in a case where I(x, θ)>Tha or Thb>I(x, θ) is satisfied. Note that "x" is an index of a pixel. Furthermore, "θ" indicates the type of a pixel. For example, "θ=0" is set when the polarization direction is 0°, "θ=90" is set when the polarization direction is 90°, "θ=135" set when the polarization direction is 135°, and "θ—1" is set in a case, where the pixel is a non-polarization pixel. The invalid pixel detection unit 32 sets an invalid flag V(x, θ) for each pixel, and sets the invalid flag of a pixel determined to be an invalid pixel as V(x, θ)=1 and the invalid flag of a pixel not determined to be an invalid pixel as V(x, θ)=0. The invalid pixel detection unit 32 outputs an invalid flag V(x, θ) indicating the detection result of the invalid pixel to the polarization information generation unit 33.

The polarization information generation unit 33 performs processing of generating the polarization information on the basis of the non-polarized image and the polarized image for each polarization direction generated by the demosaic processing unit 31, and switches processing of generating the polarization information depending on the detection result of the invalid pixel in the invalid pixel detection unit 32.

It is known that the polarization state of the object can be expressed by, for example, the polarization model formula shown in Expression (10). Note that, in Expression (10), the parameters $S_0$, $S_1$, and $S_2$ are Stokes parameters, and the Stokes parameter $S_0$ is the sum of the observation luminance of the 0° polarization and the observation luminance of the 90° polarization, and is a parameter indicating the intensity. The Stokes parameter $S_1$ is a parameter indicating a difference between the observation luminance of the 0° polarization and the observation luminance of the 90° polarization, and the Stokes parameter 52 is a parameter indicating a difference between the observation luminance of the 45° polarization and the observation luminance of the 135° polarization

[Expression 1]

$$I(x,\theta)=S_2 \cdot \sin(2 \cdot \theta)+S_1 \cdot \cos(2 \cdot \theta)+S_0 \qquad (10)$$

The polarization information generation unit 33 calculates the Stokes parameters by performing fitting to the polarization model formula shown in Expression (10) using the pixel values of the non-polarized image and the polarized image for each polarization direction, and generates and outputs polarization information indicating the calculated Stokes parameters. Furthermore, in fitting to the polarization model formula, the polarization information generation unit 33 switches processing of generating the polarization information, that is, the method of calculating the Stokes parameters on the basis of the invalid flag V(x, θ) from the invalid pixel detection unit 32, and calculates the Stokes parameters $S_0$, $S_1$, and $S_2$ in the polarization model formula of Expression (10) by, for example, the least squares method or the like using the pixel value of a pixel that has not been determined to be an invalid pixel.

Figure 7:
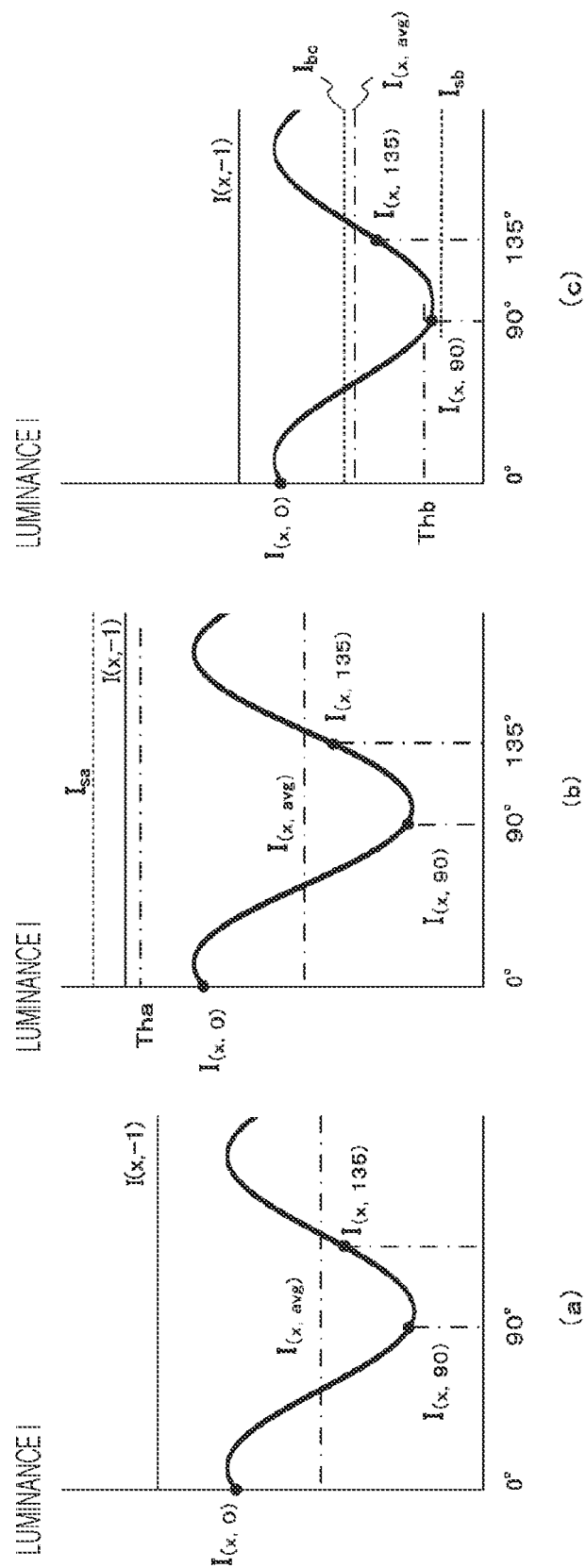
FIG. 7 is a diagram illustrating a relationship (part 1) among the luminance of a non-polarization pixel, the luminance of a polarization pixel, and the angle of a polarization direction.

For example, a polarization pixel block of 2×2 pixels includes three polarization pixels (pixels for polarization directions of "0°", "90°", and "135°") and one non-polarization pixel as illustrated in (a) of FIG. 4, FIG. 7 illustrates a relationship (part 1) among the luminance of the non-polarization pixel, the luminance of the polarization pixel, and the angle of the polarization direction (a) of FIG. 7 illustrates a case where all the pixels in the polarization pixel block are not determined to be invalid pixels. In a case where all the pixels in the polarization pixel block are not determined to be invalid pixels, that is, in a case where the invalid flags satisfy V (x, −1)=V(x, 0)=V (x, 90)=V(x, 135)=0, the Stokes parameter $S_0$ is calculated on the basis of Expression (11). Note that the coefficient K in Expression (11) is a coefficient that absorbs the sensitivity difference between the polarization pixel and the non-polarization pixel.

[Expression 2]

$$S_0 = \frac{\{K * I(x, -1) + I(x, 0) + I(x, 90)\}}{2} \qquad (11)$$

Moreover, the polarization information generation unit 33 calculates the Stokes parameters $S_2$ and $S_1$ by the least squares method or the like using the pixel values I(x, 0), I(x, 90), and I(x, 135) and the Stokes parameter $S_0$.

Next, a case where only a non-polarization pixel in a polarization pixel block is determined to be an invalid pixel will be described. (b) of FIG. 7 illustrates a case where only a non-polarization pixel is determined to be an invalid pixel. When the amount of incident light on the polarization image pickup unit 20 increases and saturation occurs in the non-polarization pixel, the pixel value of the non-polarization pixel, for example, becomes a pixel value I(x, −1) that is at a lower level than the pixel value Isa depending on the amount of incident light. A non-polarization pixel having a pixel value that is saturated in this manner is determined to be an invalid pixel. Therefore, in a case where only a non-polarization pixel is determined to be an invalid pixel, that is, in a case where the invalid flags satisfy V(x, −1)=1 and V(x, 0) V(x, 90)=V(x, 135)=0, the polarization information generation unit 33 calculates the Stokes parameters without using the non-polarization pixel. The polarization information generation unit 33 calculates the Stokes parameters $S_2$, $S_1$, and $S_0$ by the least squares method or the like from the pixel values I(x, 0), I(x, 90), and I(x, 135) of the polarization pixels that are not invalid pixels and the polarization model formula shown in Expression (10).

Next, a case where only one polarization pixel in the polarization pixel block is determined to be an invalid pixel will be described. (c) of FIG. 7 illustrates a case where only one polarization pixel in the polarization pixel block is determined to be an invalid pixel. When the amount of incident light on the polarization image pickup unit 20 decreases and black crushing occurs in a polarization pixel for a polarization direction of 90 degrees, the pixel value of the polarization pixel, for example, becomes a pixel value I(x, 90) that is at a higher level than the pixel value Isb depending on the amount of incident light. As described above, the polarization pixel in which black crushing occurs in the pixel value is determined as an invalid pixel. Note that (c) of FIG. 7 illustrates that the average value I(x, avg) of the polarization model changes to the average value Ibc due to black crushing of the polarization pixel. Therefore, in a case where only one polarization pixel in the polarization pixel block is determined to be an invalid pixel, for example, in a case where the invalid flags satisfy V(x, −1)=V(x, 0)=V(x, 135) and V(x, 90)=1, the polarization information generation unit 33 calculates the Stokes parameters without using the 135° polarization pixel determined to be an invalid pixel. The polarization information generation unit 33 calculates the Stokes parameter $S_0$ on the basis of Expression (12). Note that the coefficient K is a coefficient that absorbs the sensitivity difference between the polarization pixel and the non-polarization pixel.

$$S_0 = K \times I(x, -1) \qquad (12)$$

Moreover, the polarization information generation unit 33 calculates the Stokes parameters $S_2$ and $S_1$ by the least squares method or the like using the pixel values I(x, 0) and I(x, 90) and the Stokes parameter $S_0$.

Note that the polarization information Generation unit 33 cannot calculate the Stokes parameters $S_2$, $S_1$, and $S_0$ in a case where two polarization pixels of three polarization pixels in the polarization pixel block are invalid pixels. In this case, the polarization information generation unit 33 may use information indicating that the polarization characteristic cannot be acquired as the polarization information.

Figure 8:
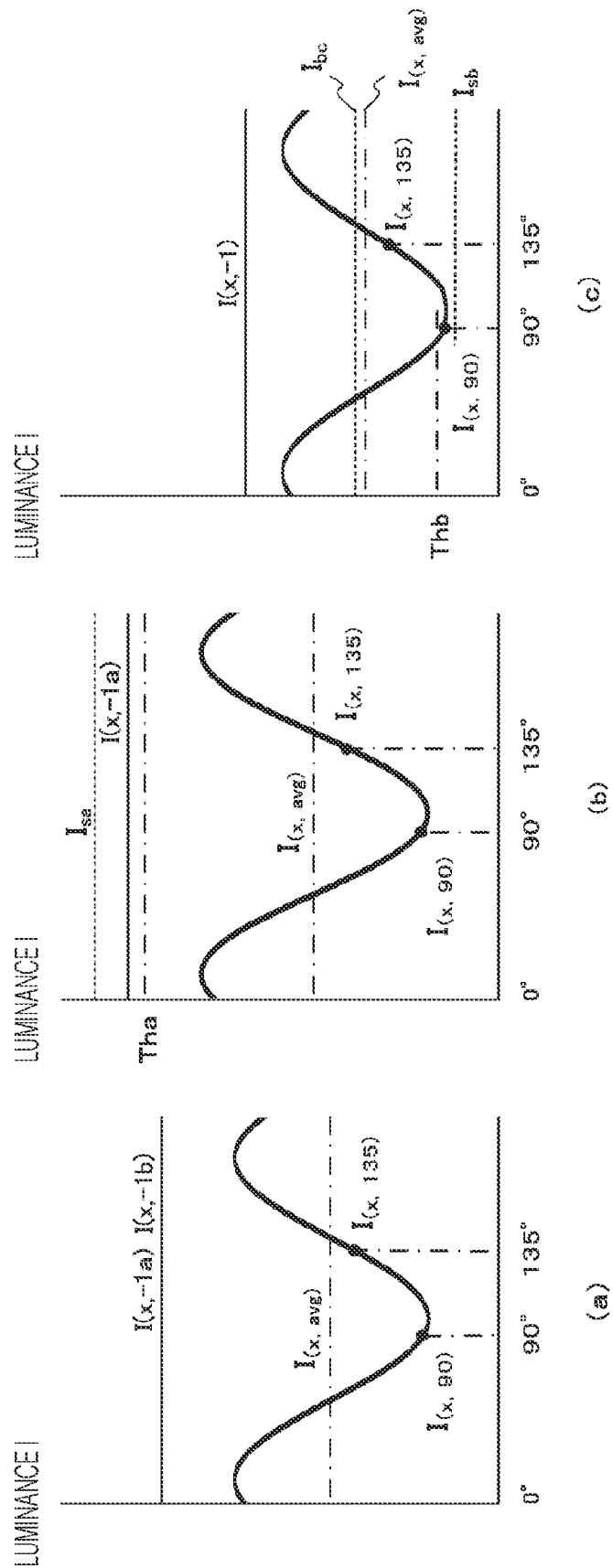
FIG. 8 is a diagram illustrating a relationship (part 2) among a luminance of a non-polarization pixel, a luminance of a polarization pixel, and an angle of a polarization direction.

Furthermore, a polarization pixel block of 2×2 pixels includes two polarization pixels (pixels for polarization directions of "90°" and "135°") and two non-polarization pixels as illustrated in (b) of FIG. 4. FIG. 8 illustrates the relationship (part 2) among the luminance of the non-polarization pixel, the luminance of the polarization pixel, and the angle of the polarization direction (a) of FIG. 8 illustrates a case where all the pixels in the polarization pixel block are not determined to be invalid pixels. In a case where all the pixels in the polarization pixel block are not determined to be invalid pixels, that is, in a case where the invalid flags satisfy V(x, −1a)=V(x, −1b)=V(x, 90)=V(x, 135)=0, the Stokes parameter $S_0$ is calculated on the basis of Formula (11). Note that the invalid flag V (x, −1a) indicates a detection result of one non-polarization pixel of the two non-polarization pixels, and the invalid flag V(x, −1b) indicates a detection result of another non-polarization pixel of the two non-polarization pixels.

Moreover, the polarization information generation unit 33 calculates the Stokes parameters $S_2$ and $S_1$ by the least squares method or the like using the pixel values I(x, 90) and I(x, 135) and the Stokes parameter $S_0$.

Next, a case where only one non-polarization pixel in the polarization pixel block is determined to be an invalid pixel will be described. (b) of FIG. 8 illustrates a case where only one non-polarization pixel is determined to be an invalid pixel. When the amount of incident light on the polarization image pickup unit 20 increases and saturation occurs in the non-polarization pixel, the pixel value of the non-polarization pixel, for example, becomes a pixel value I(x, −1a) that as at a lower level than the pixel value Isa depending on the amount of incident light. A non-polarization pixel having a pixel value that is saturated in this manner is determined to be an invalid pixel. Therefore, in a case where only one non-polarization pixel is determined to be an invalid pixel, that is, the polarization information generation unit 33 sets the invalid flags as V(x−1a)=1, V(x, −1b)=V(x, 90)=V(x, 135)=0. In this case, the pixels used to calculate the Stokes parameters are one non-polarization pixel and two polarization pixels, similar to the case where only one polarization pixel in the polarization pixel block is determined to be an invalid pixel in the pixel configuration illustrated in (a) of FIG. 4. Therefore, the polarization information generation unit 33 calculates the Stokes parameters $S_2$, $S_1$, and $S_0$ as described above by using the pixel values of the non-polarization pixel that is not an invalid pixel and the two polarization pixels.

Note that the polarization information generation unit 33 cannot calculate the Stokes parameters $S_2$, $S_1$, and $S_0$ in a case where two non-polarization pixels or one polarization pixel in the polarization pixel block is determined to be an invalid pixel. (c) of FIG. 8 illustrates a case where one polarization pixel in the polarization pixel block is determined to be an invalid pixel. When the amount of incident light on the polarization image pickup unit 20 decreases and black crushing occurs in a polarization pixel for a polarization direction of 90 degrees, the pixel value of the polarization pixel, for example, becomes a pixel value I(x, 90) that is at a higher level than the pixel value Isb depending on the amount of incident light. As described above, the polarization pixel in which black crushing occurs in the pixel value is determined as an invalid pixel. Note that (c) of FIG. 8 illustrates that the average value I(x, avg) of the polarization model changes to the average value Ibc due to black crushing of the polarization pixel. Therefore, in a case where only one polarization pixel in the polarization pixel block is determined to be an invalid pixel, the polarization information generation unit 33 sets the invalid flags as V(x, 90)=1 and V(x, −1a)=V(x, −1b)=V(x, 135)=0. Here, since a polarization pixel for a polarization direction of 90 degrees is an invalid pixel, fitting to the polarization model formula cannot be performed in a case where the pixel values of a polarization pixel for 135 degrees and two non-polarization pixels are used. Therefore, the polarization information generation unit 33 may use information indicating that the polarization characteristic cannot be acquired as the polarization information.

Figure 9:
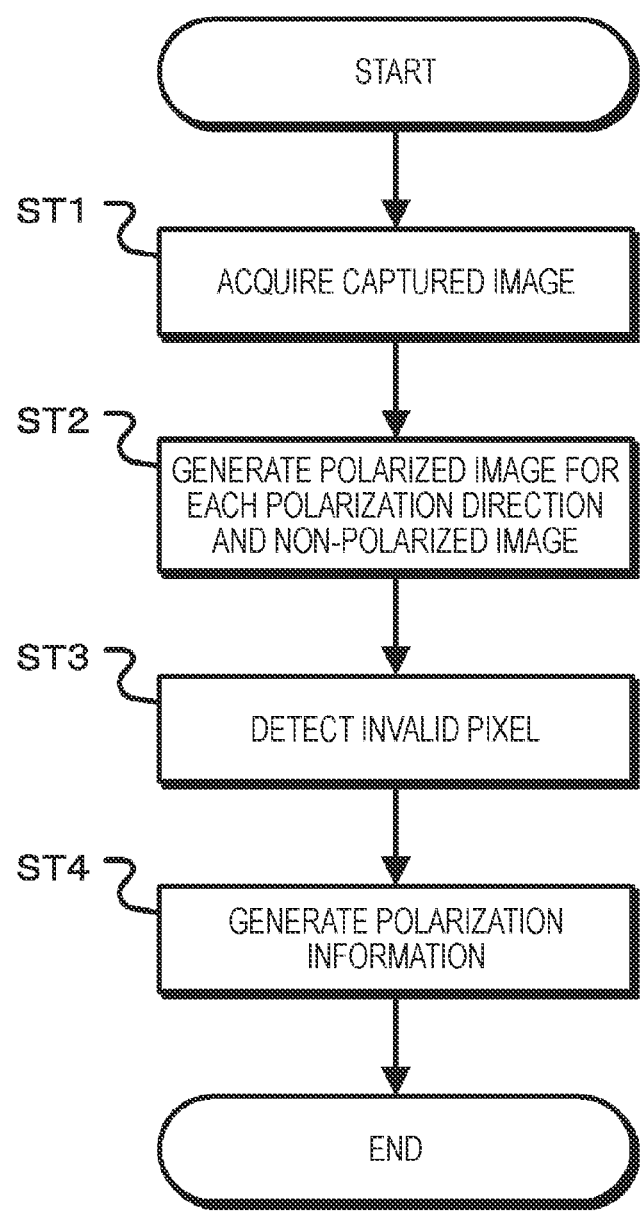
FIG. 9 is a flowchart showing an operation of an image processing unit.

FIG. 9 is a flowchart showing an operation of the image processing unit. In step ST1, the image processing unit acquires a captured image. The image processing unit generates a captured image by using the polarization image pickup unit including the polarization pixels and the non-polarization pixels, and proceeds to step ST2.

In step ST2, the image processing unit generates a polarized image for each polarization direction and a non-polarized image. The image processing unit performs demosaic processing by using the captured image, generates a polarized image for each polarization direction and a non-polarized image, and proceeds to step ST3.

In step ST3, the image processing unit detects an invalid pixel. The image processing unit compares the pixel values of the non-polarization pixel and the polarization pixel with a preset saturation detection threshold. Tha and a preset black crushing detection threshold Thb, detects a pixel having a pixel value larger than the saturation detection threshold Tha and a pixel having a pixel value smaller than the black crushing detection threshold Thb as invalid pixels, and proceeds to step ST4.

In step ST4, the image processing unit generates polarization information. The image processing unit performs fitting to the polarization model formula by using the pixel values of a polarization pixel that is not an invalid pixel and a non-polarization pixel on the basis of the pixel value for each polarization direction, the non-polarization pixel value, and the invalid pixel detection result, and calculates, for example, the Stokes parameters. The image processing unit generates polarization information indicating the calculated Stokes parameters.

As described above, the image processing unit causes the demosaic processing unit 31 to generate the non-polarized image and the polarized image for each polarization direction from the captured image generated by the polarization image pickup unit 20 in which non-polarization pixels and polarization pixels for at least two polarization directions are disposed. Furthermore, the image processing unit causes the polarization information generation unit 33 to generate polarization information indicating the polarization characteristic of the object included in the captured image from the non-polarized image and the polarized image generated by the demosaic processing unit 31. As described above, since the polarization information is generated using not only the polarized image but also the highly sensitive non-polarized image, it is possible to acquire highly accurate polarization information as compared with a case where the polarization information is generated on the basis of the polarized image. Moreover, the image processing unit detects an invalid pixel from the non-polarized image and the polarized image and generates polarization information without using the invalid pixel, so that correct polarization information can be acquired.

2. Another Embodiment

Meanwhile, although a case where the polarization angles of the polarization pixels are "0°, 90°, and 135°" in the above-described image processing unit has been illustrated, the polarization angles may be angles not orthogonal to each other. For example, the polarization pixel block may include one non-polarization pixel and three polarization pixels for polarization angles of "0°, 60°, and 120°".

When the polarization angles are set in this manner, even if one of the polarization pixels for three different polarization directions becomes a black-crushed pixel, the remaining two polarization directions are not orthogonal to each other, and thus, fitting to the polarization model formula can be performed on the basis of the non-polarization pixel and two polarization pixels that are not orthogonal to each other. Therefore, even if a polarization pixel for any one of three different polarization directions becomes a black-crushed pixel, the polarization information can be acquired.

Furthermore, although the polarization information generation unit 33 calculates the Stokes parameters as the polarization information in the above-described embodiment, the polarization information is not limited to the case of indicating the Stokes parameters. For example, the polarization information Generation unit 33 may generate normal line information as the polarization information. In this case, the polarization information generation unit 33 calculates the azimuth angle φ on the basis of Expression (13), for example. Furthermore, the polarization information generation unit 33 calculates the zenith angle θ on the basis of Expression (14). Note that the parameters A, B, C, and D in Expression (14) are values calculated by Expressions (15) to (18), and the degree of polarization p shown in Expressions (15) and (16) is calculated on the basis of Expression (19). Furthermore, in Expressions (15), (17), and (18), the parameters A, B, C, and D are calculated using the refractive index n of the object OB.

[Equation 3]

$$\phi = \frac{1}{2}\arcsin\left(\frac{S_2}{\sqrt{S_2^2 + S_1^2}}\right) \text{ or } \frac{1}{2}\arccos\left(\frac{S_2}{\sqrt{S_2^2 + S_1^2}}\right) \quad (13)$$

$$\theta = \arcsin\left(\sqrt{-B\frac{C(A+B) - \sqrt{C^2(A+B)^2 - D^2(A^2 - B^2)}}{2(A^2 - B^2)}}\right) \quad (14)$$

$$A = 2(1-\rho) - (1+\rho)\left(n^2 + \frac{1}{n^2}\right) \quad (15)$$

$$B = 4\rho \quad (16)$$

$$C = 1 + n^2 \quad (17)$$

$$D = 1 - n^2 \quad (18)$$

$$\rho = \frac{\sqrt{S_2^2 + S_1^2}}{S_0} \quad (19)$$

Figure 10:
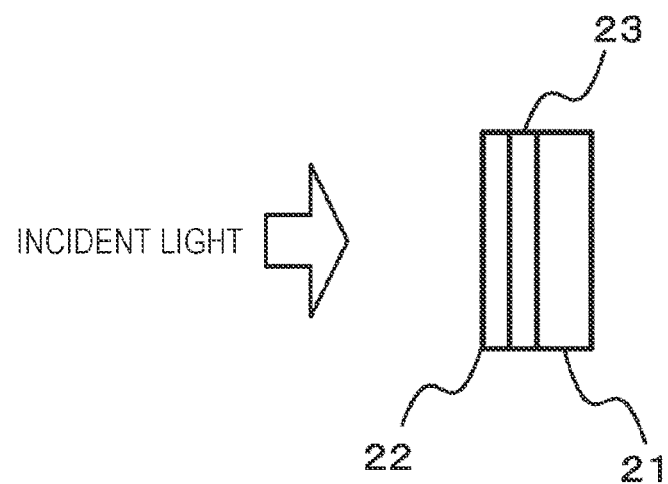
FIG. 10 is a diagram illustrating a configuration of a polarization image pickup unit that generates a color captured image.

Moreover, the polarization image pickup unit 20 may be configured to generate a color captured image, and the image processing unit 30 may generate polarization information on the basis of the color captured image. FIG. 10 illustrates a configuration of a polarization image pickup snit that generates a color captured image. In a case where a color captured image is generated by the polarization image pickup unit 20, a color mosaic filter 23 is provided on the incident surface of the image pickup element 21. Note that the color mosaic filter 23 is not limited to being provided between the image pickup element 21 and the polarizing filter 22, and may be provided on the incident surface of the polarizing filter 22.

The polarizing filter 22 and the color mosaic filter 23 include pixels of the same color for each polarization direction so as not to be influenced by a difference in color between polarization pixels for different polarization directions. Furthermore, the polarizing filter 22 and the color mosaic filter 23 are configured to obtain the pixel value of a non-polarization pixel for each color.

Figure 11:
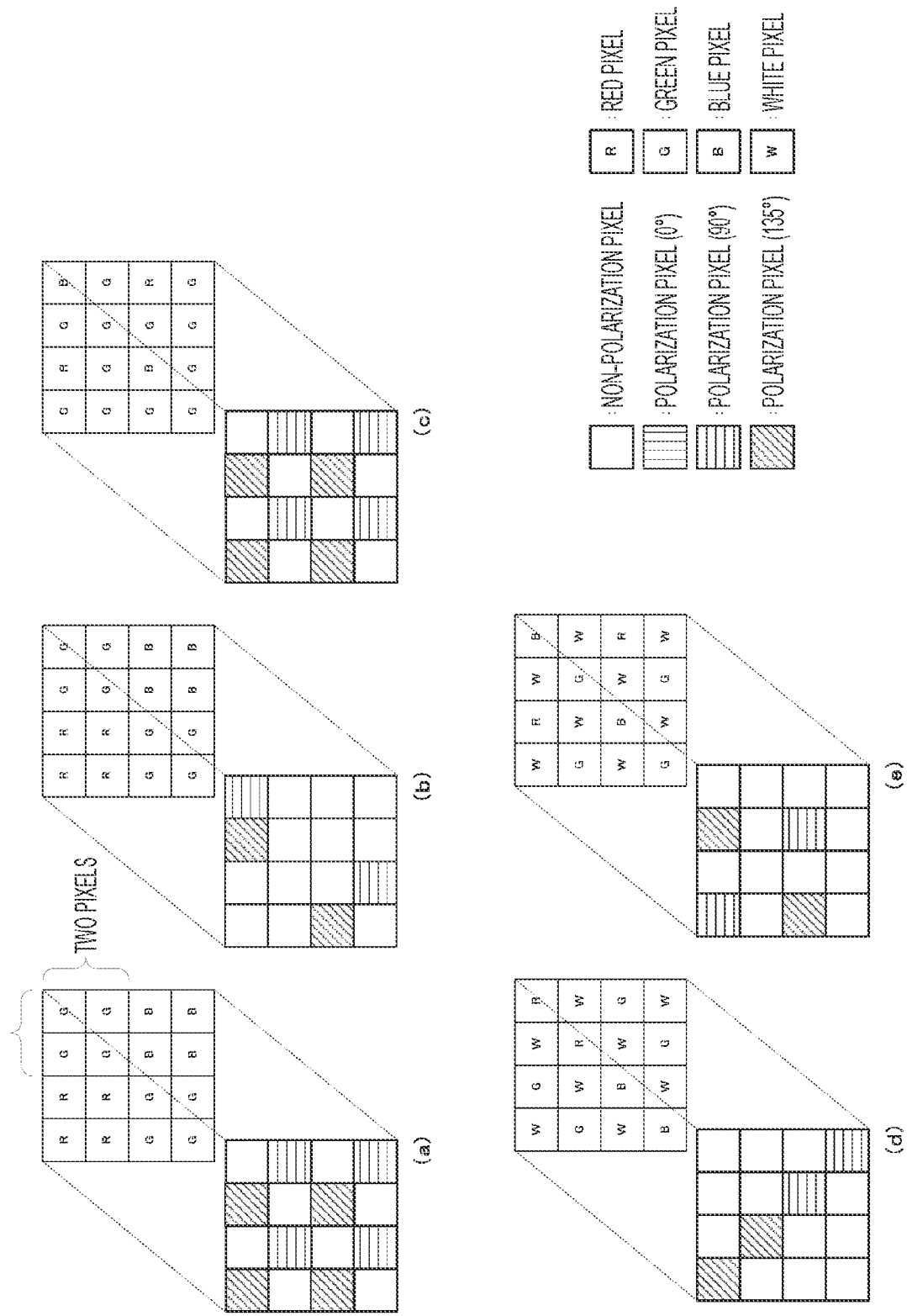
FIG. 11 illustrates a relationship between a color mosaic filter and a polarizing filter (two polarization directions).

FIG. 11 illustrates a relationship between a color mosaic filter and a polarizing filter (two polarization directions). In (a) of FIG. 11, the polarizing filter 22 has a configuration in which two polarization pixels for different polarization directions and two non-polarization pixels are received in a 2×2 pixel region. Furthermore, the color mosaic filter 23 has a configuration in which a 2×2 pixel region is set as a color unit of red (R), green (G), or blue (B), and a 4×4 pixel region includes a red. 2×2 pixel region, a blue 2×2 pixel region, and two green 2×2 pixel regions. In this case, in the polarization image pickup unit 20, the pixel value of a polarization pixel for each of two polarization directions and the pixel values of non-polarization pixels of any color of red, green, or blue are generated for each 2×2 pixel region.

In (b) of FIG. 11, the color mosaic filter 23 has a configuration in which a 2/2 pixel region is set as a color unit of red (R), green (G), or blue (B). Furthermore, the polarizing filter 22 has a configuration in which two polarization pixels for different polarization directions and two non-polarization pixels are received in a green 2×2 pixel region, and a 4×4 region includes a red 2×2 pixel region, a blue 2×2 pixel region, and two green 2×2 pixel regions. In this case, in the polarization image pickup unit 20, the pixel value of a non-polarization pixel ofany color of red, green, or blue, and the pixel values of polarization pixels for two polarization directions of green are generated for each 2×2 pixel region.

In (c) of FIG. 11, the polarizing filter 22 has a configuration in which two polarization pixels for different polarization directions and two non-polarization pixels are received in a 2×2 pixel region. Furthermore, the color mosaic filter 23 has a configuration in which a 2×2 pixel region includes three green (G) pixels and one red OR) or blue (13) pixel, and a 4×4 pixel region includes two 2×2 pixel regions each including a red pixel and two 2×2 pixel regions each including a blue pixel. In this case, in the polarization image pickup unit 20, the pixel values of non-polarization pixels that are a green pixel and a red pixel or a green pixel and a blue pixel, and the pixel value of a polarization pixel for each of two polarization directions of green are generated for each 2×2 pixel region.

In (d) of FIG. 11, the color mosaic filter 23 has a configuration in which a 2×2 pixel region includes two white (W) pixels and two pixels of any color of red (R), green (G), or blue (B). Furthermore, a 4/4 pixel region includes a 2/2 pixel region including red pixels, a 2/2 pixel region including blue pixels, and two 2/2 pixel regions including green pixels. Furthermore, the polarizing filter 22 has a configuration in which white pixels in a 2/2 pixel region including green pixels are set as polarization pixels for the same polarization direction, and two polarization pixels for each of two polarization directions are provided in a 4/4 pixel region. In this case, in the polarization image pickup unit 20, the pixel values of non-polarization pixels of any color of red, green, or blue, and the pixel values of polarization pixels for any polarization direction of two polarization directions in a 2/2 pixel region including green pixels are generated for each 2/2 pixel region.

In (e) of FIG. 11, the color mosaic filter 23 has a configuration in which a 2/2 pixel region includes two white (F) pixels and green (G) and red (R) pixels, or two white (F) pixels and green (G) and blue (B) pixels. Furthermore, a 4/4 pixel region includes two 2/2 pixel regions each including a red pixel, and two 2/2 pixel regions each including a blue pixel. Furthermore, the polarizing filter 22 has a configuration in which one white pixel in the 2/2 pixel region is a polarization pixel, and two polarization pixels for each of two polarization directions are provided in a 4/4 pixel region. In this case, in the polarization image pickup unit 20, the pixel values of non-polarization pixels of green and red or green and blue, and the pixel value of a polarization pixel for any polarization direction of two polarization directions are generated for each 2×2 pixel region.

Furthermore, in FIG. 11, in the polarization image pickup unit 20, the pixel value of a non-polarization pixel of each color and the pixel value of a polarization Axel for each polarization direction are generated for each 4×4 pixel region.

Figure 12:
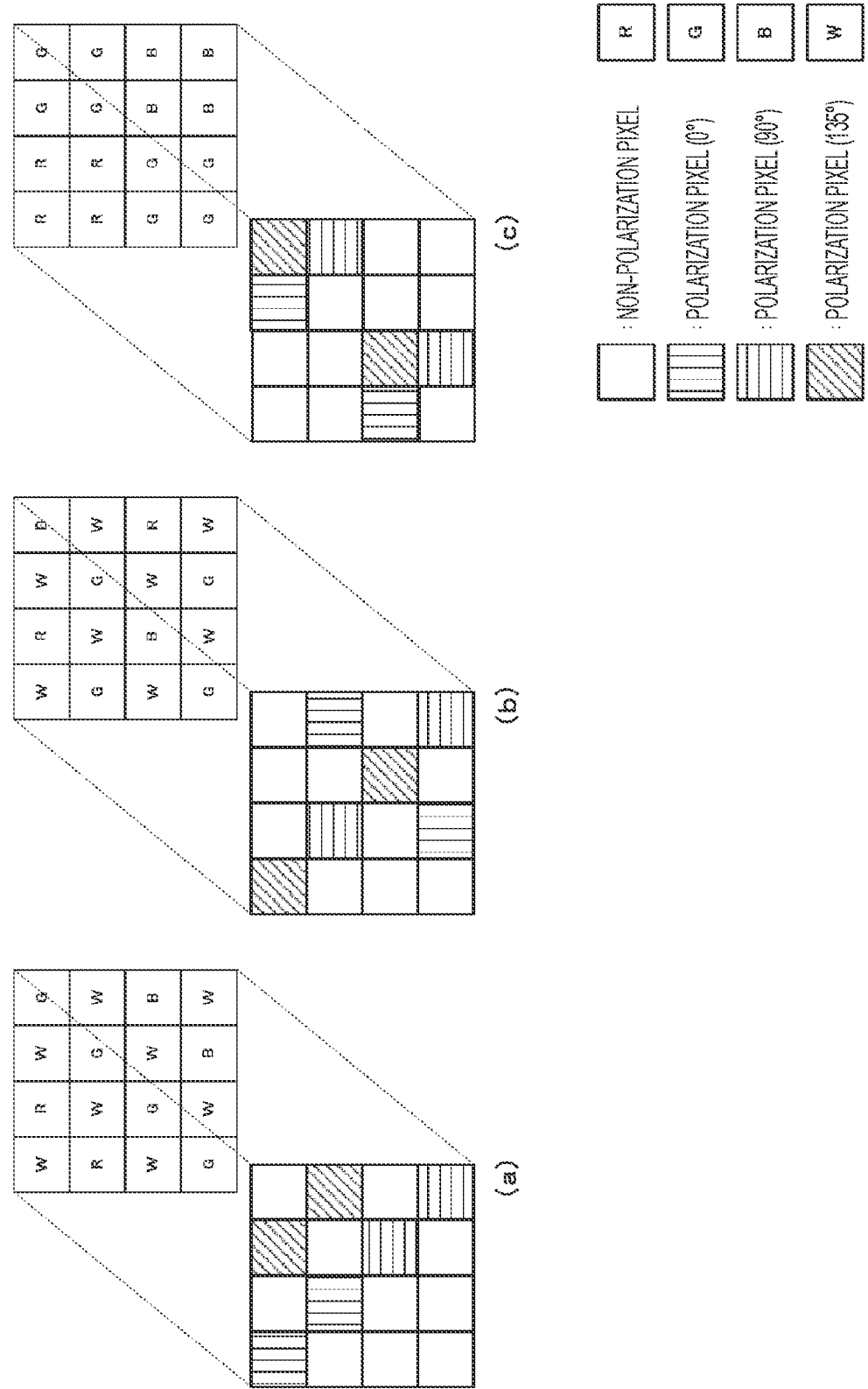
FIG. 12 illustrates a relationship between a color mosaic filter and a polarizing filter (three polarization directions).

FIG. 12 illustrates a relationship between a color mosaic filter and a polarizing Filter (three polarization directions). In (a) of FIG. 12, the color mosaic filter 23 has a configuration in which a 2×2 pixel region includes two white OW) pixels and two pixels of any color of red. (R), green (G), or blue (B). Furthermore, a 4×4 pixel region includes a 2×2 pixel region including red pixels, a 2×2 pixel region including blue pixels, and two 2×2 pixel regions including green pixels. Furthermore, the polarizing filter 22 has a configuration in which white pixels in a 2×2 pixel region are polarization pixels for any polarization direction, and two polarization pixels for each of four polarization directions are provided in a 4×4 pixel region. In this case, in the polarization image pickup unit 20, the pixel values of non-polarization pixels of any color of red, green, or blue, and the pixel values of polarization pixels for any polarization direction of four polarization directions are generated for each 2/2 pixel region.

In (b) of FIG. 12, the color mosaic filter 23 has a configuration in which a 2×2 pixel region includes two white (VI) pixels and green (G) and red (R) pixels, or two white (W) pixels and green (G) and blue (B) pixels. Furthermore, a 4×4 pixel region includes two 2×2 pixel regions each including a red pixel, and two 2×2 pixel regions each including a blue pixel. Furthermore, the polarizing filter 22 has a configuration in which two white pixels in a 2×2 pixel region are polarization pixels for different polarization directions, and two polarization pixels for each of four polarization directions are provided in a 4/4 pixel region. In this case, in the polarization image pickup unit 20, the pixel values of non-polarization pixels of Green and red or green and blue, and the pixel values of polarization pixels for two polarization directions are generated for each 2×2 pixel region. In this case, in the polarization image pickup unit 20, the pixel values of non-polarization pixels of green and red or green and blue, and the pixel values of polarization pixels for any two polarization directions of four polarization directions are generated for each 2×2 pixel region.

In (c) of FIG. 12, the color mosaic filter 23 has a configuration in which a 2/2 pixel region is set as a color unit of red (R), green (G), or blue (B), and a 4×4 pixel region includes a red 2×2 pixel region, a blue 2×2 pixel region, and two green 2×2 pixel regions. Furthermore, the polarizing filter 22 has a configuration in which four polarization pixels for different polarization directions are provided in each green 2×2 pixel region. In this case, in the polarization image pickup unit 20, the pixel values of non-polarization pixels are generated in a red or blue 2×2 pixel region, and the pixel value of a polarization pixel for each polarization direction is generated in each green 2×2 pixel region.

Furthermore, in (a) and (b) of FIG. 12, in the polarization image pickup unit 20, the pixel value of a non-polarization pixel of each color and the pixel value of a polarization pixel for each polarization direction are generated for each 4/4 pixel region.

In a case where a color captured image is generated by the polarization image pickup unit 20, the demosaic processing unit 31 generates a non-polarized image for each color component from the color image. Furthermore, the demosaic processing unit 31 generates a polarized image for each polarization direction. The polarization information generation unit 33 generates polarization information by using the polarized image and the non-polarized image generated by the demo sale processing unit 31. Since the polarization pixels are pixels of white or the same color as described above, there is no influence of a difference in color between the polarization pixels. Therefore, the polarization information can be correctly generated even when the color captured image is used. Since a green pixel is a polarization pixel in (c) of FIG. 12, note that the green pixel has lower sensitivity than a red pixel or a blue pixel that is a non-polarization pixel. Therefore, if the pixel value of the green pixel is corrected depending on the decrease in sensitivity of the polarization pixel, the demosaic processing of the conventional Bayer array is performed, so that a color component image similar to that in a case where the pixel of each color component is a non-polarization pixel can be generated.

In this way, if a color captured image is generated by the polarization image pickup unit, highly accurate polarization information can be generated by using colors. Furthermore, in a case where a color captured image is generated by the polarization image pickup unit, the image processing unit 30 can generate a non-polarized image for each color by performing integration processing using pixels of the same color.

Furthermore, the configuration of the image processing unit is not limited to the configuration illustrated in FIG. 1. For example, since the image processing unit. 30 is configured corresponding to the pixel configuration of the polarization image pickup unit 20 as described above, the polarization image pickup unit 20 and the image processing unit 30 may be configured integrally.

3. Application Example

The technology according to the present disclosure can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, a robot, a construction machine, or an agricultural machine (tractor). When applied to such a field, highly accurate polarization information can be acquired, and thus, the surrounding environment can be accurately grasped in three dimensions on the basis of the polarization information, for example, and the fatigue of the driver or the worker can be reduced. Furthermore, automatic driving and the like can be performed more safely.

The technology according to the present disclosure can also be applied to the medical field. For example, when applied to a case where a captured image of a surgical site is used in performing surgery, an image without a three-dimensional shape or reflection of the surgical site can be obtained with high accuracy, and it is possible to reduce fatigue of an operator or perform surgery safely and more reliably.

Furthermore, the technology according to the present disclosure can also be applied to fields such as public services. For example, when an image of an object is published in a book, a magazine, or the like, unnecessary reflection components and the like can be accurately removed from the image of the object.

The series of processing described in the specification can be executed by hardware, software, or a combined configuration of both. In the case of executing processing by software, a program in which a processing sequence is recorded is installed and executed in a memory in a computer incorporated in dedicated hardware. Alternatively, the program can be installed and executed in a general-purpose computer capable of executing various types of processing.

For example, the program can be recorded in advance in a hard disk, a solid state drive (SSD), or a read only memory (ROM) functioning as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a nu-Ray disc (SD) (registered trademark), a magnetic disk, or a semiconductor memory card. Such a removable recording medium can be provided as so-called package software.

Furthermore, in addition to installing the program from the removable recording medium to the computer, the program may be transferred from a download site to the computer wirelessly or by wire via a network such as a local area network (LAN) or the Internet. In the computer, the program thus transferred can be received and installed in a recording medium such as a built-in hard disk.

Note that the effects described in the present specification are merely exemplary and not restrictive, and there may be additional effects that are not described. Furthermore, the present technology should not be construed as being limited to the above-described embodiments. The embodiments of this technology disclose the present technology in the form of exemplification, and it is obvious that those skilled in the art can make modifications or substitutions of the embodiments without departing from the gist of the present technology. That is, in order to determine the gist of the present technology, the claims should be taken into consideration.

Furthermore, an image processing device of the present technology can also have the following configurations.

(1) An image processing device including:
an invalid pixel detection unit that detects a saturated pixel and a black-crushed pixel as invalid pixels from a non-polarized image and a plurality of polarized images for different polarization directions obtained by performing image pickup using a polarization image pickup unit; and
a polarization information generation unit that performs processing of generating polarization information on the basis of the non-polarized image and the polarized images, and switches processing of generating the polarization information depending on a detection result of the invalid pixels in the invalid pixel detection unit.

(2) The image processing device according to item (1), in which the polarization information generation unit generates the polarization information by using pixels of the plurality of polarized images in a case where a pixel of the non-polarized image is detected as an invalid pixel.

(3) The image processing device according to item (1), in which, in a case where a pixel of any one of the plurality of polarized images is detected as an invalid pixel, the polarization information generation unit generates the polarization information by using a pixel of the non-polarized image and a pixel of another polarized image that is not detected as an invalid pixel.

(4) The image processing device according to item (3),
in which the plurality of polarized images is three or more polarized images for different polarization directions, and
the polarization information generation unit generates the polarization information by using a pixel of the non-polarized image and pixels of at least two polarized images that are not detected as invalid pixels.

(5) The image processing device according to item (4), in which the at least two polarized images are polarized images for polarization directions that are not orthogonal to each other.

(6) The image processing device according to any one of items (1) to (5), in which the polarization information generation unit generates the polarization information by using a pixel of the non-polarized image and a pixel of a polarized image in a case where no invalid pixel is detected.

(7) The image processing device according to items (1) to (6), in which the invalid pixel detection unit detects the saturated pixel from the non-polarized image and the black-crushed pixel from the polarized images as the invalid pixels.

(8) The image processing device according to any one of items (1) to (7), in which the invalid pixel detection unit detects a pixel having a pixel value larger than a preset saturation detection threshold as the saturated pixel, and detects a pixel having a pixel value smaller than a preset black crushing detection threshold as the black-crushed pixel.

(9) The image processing device according to item (8), in which the saturation detection threshold and the black crushing detection threshold are set depending on a characteristic of an image acquired by the polarization image pickup unit performing the image pickup.

(10) The image processing device according to item (9), in which the black crushing detection threshold is set to be larger than an output minimum value of the polarization image pickup unit by a first level, and the saturation detection threshold is set to be smaller than an output maximum value of the polarization image pickup unit by a second level smaller than the first level.

REFERENCE SIGNS LIST

10 System
20 Polarization image pickup unit
21 Image pickup element
22 Polarizing filter
23 Color mosaic filter
30 Image processing unit
31 Demosaic processing unit
32 Invalid pixel detection unit
33 Polarization information generation unit 211 Pixel array unit
212 Vertical scanning circuit
213 Horizontal scanning circuit
310 Non-polarization pixel interpolation unit
311 Polarization pixel averaging processing unit
312 Non-polarization pixel averaging processing unit
313 Central pixel acquisition unit
314 Correlation processing unit.

The invention claimed is:

1. An image processing device comprising:
an invalid pixel detection unit that detects a saturated pixel and a black-crushed pixel as invalid pixels from a non-polarized image and a plurality of polarized images for different polarization directions obtained by performing image pickup using a polarization image pickup device; and
a polarization information generation unit that performs processing of generating polarization information on a basis of the non-polarized image and the polarized images, and switches processing of generating the polarization information depending on a detection result of the invalid pixels in the invalid pixel detection unit,
wherein the invalid pixel detection unit detects a pixel having a pixel value larger than a preset saturation detection threshold as the saturated pixel, and
wherein the invalid pixel detection unit and the polarization information generation unit are each implemented via at least one processor.

2. The image processing device according to claim 1, wherein the polarization information generation unit generates the polarization information by using pixels of the plurality of polarized images in a case where a pixel of the non-polarized image is detected as an invalid pixel.

3. The image processing device according to claim 1, wherein, in a case where a pixel of any one of the plurality of polarized images is detected as an invalid pixel, the polarization information generation unit generates the polarization information by using a pixel of the non-polarized image and a pixel of another polarized image that is not detected as an invalid pixel.

4. The image processing device according to claim 3, wherein the plurality of polarized images are three or more polarized images for different polarization directions, and
the polarization information generation unit generates the polarization information by using a pixel of the non-polarized image and pixels of at least two polarized images that are not detected as invalid pixels.

5. The image processing device according to claim 4, wherein the at least two polarized images are polarized images for polarization directions that are not orthogonal to each other.

6. The image processing device according to claim 1, wherein the polarization information generation unit generates the polarization information by using a pixel of the non-polarized image and a pixel of a polarized image in a case where no invalid pixel is detected.

7. The image processing device according to claim 1, wherein the invalid pixel detection unit detects the saturated pixel from the non-polarized image and the black-crushed pixel from the polarized images as the invalid pixels.

8. The image processing device according to claim 1, wherein the invalid pixel detection unit detects a pixel having a pixel value smaller than a preset black crushing detection threshold as the black-crushed pixel.

9. The image processing device according to claim 8, wherein the saturation detection threshold and the black crushing detection threshold are set depending on a characteristic of an image acquired by the polarization image pickup device performing the image pickup.

10. The image processing device according to claim 9, wherein the black crushing detection threshold is set to be larger than an output minimum value of the polarization image pickup device by a first level, and the saturation detection threshold is set to be smaller than an output maximum value of the polarization image pickup device by a second level smaller than the first level.

11. An image processing method comprising:
detecting a saturated pixel and a black-crushed pixel as invalid pixels from a non-polarized image and a plurality of polarized images for different polarization directions obtained by performing image pickup using a polarization image pickup device;
performing processing of generating polarization information on a basis of the non-polarized image and the polarized images;
switching processing of generating the polarization information depending on a detection result of the invalid pixels; and
detecting a pixel having a pixel value larger than a preset saturation detection threshold as the saturated pixel.

12. A non-transitory computer-readable medium having embodied thereon a program, which when executed by a computer causes the computer to execute an image processing method, the method comprising:
detecting a saturated pixel and a black-crushed pixel as invalid pixels from a non-polarized image and a plurality of polarized images for different polarization directions obtained by performing image pickup using a polarization image pickup device;
performing processing of generating polarization information on a basis of the non-polarized image and the polarized images;
switching processing of generating the polarization information depending on a detection result of the invalid pixels; and
detecting a pixel having a pixel value larger than a preset saturation detection threshold as the saturated pixel.

* * * * *